United States Patent
Shetty et al.

(10) Patent No.: US 11,169,833 B2
(45) Date of Patent: Nov. 9, 2021

(54) APPLICATIONS DISCOVERY BASED ON FILE SYSTEM DIRECTORIES

(71) Applicant: VMWARE, INC., Palo Alto, CA (US)

(72) Inventors: Divith Shetty, Bangalore (IN); Vipul Chaudhary, Bangalore (IN); Vinay Vivekananda, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 53 days.

(21) Appl. No.: 16/280,072

(22) Filed: Feb. 20, 2019

(65) Prior Publication Data

US 2020/0183719 A1 Jun. 11, 2020

(30) Foreign Application Priority Data

Dec. 7, 2018 (IN) .......................... IN201841046330

(51) Int. Cl.
*G06F 9/455* (2018.01)
*G06F 16/903* (2019.01)

(52) U.S. Cl.
CPC ...... *G06F 9/45545* (2013.01); *G06F 9/45558* (2013.01); *G06F 16/90344* (2019.01); *G06F 2009/45591* (2013.01)

(58) Field of Classification Search
CPC ... G06F 9/45558; G06F 9/455; G06F 9/45545
See application file for complete search history.

(56) References Cited

U.S. PATENT DOCUMENTS

| | | | |
|---|---|---|---|
| 2004/0255295 A1* | 12/2004 | Stackhouse | G06F 9/5066 718/100 |
| 2006/0200450 A1* | 9/2006 | Keane | G06F 16/284 |
| 2006/0294115 A1* | 12/2006 | Armangau | G06F 16/13 |
| 2013/0054601 A1* | 2/2013 | Whitlock | G06F 16/11 707/737 |
| 2013/0205020 A1* | 8/2013 | Broda | H04L 43/08 709/224 |
| 2014/0165190 A1* | 6/2014 | Quigley | G06F 21/556 726/22 |
| 2014/0282433 A1* | 9/2014 | Eilam | G06F 11/3676 717/131 |
| 2017/0315795 A1* | 11/2017 | Keller | G06F 11/3409 |
| 2018/0157752 A1* | 6/2018 | Arikatla | G06F 16/182 |
| 2018/0336021 A1* | 11/2018 | Scrivano | G06F 8/63 |
| 2018/0357068 A1* | 12/2018 | Ambichl | G06F 9/44521 |

* cited by examiner

*Primary Examiner* — Tuan C Dao

(57) ABSTRACT

Techniques for discovering applications based on file system directories are disclosed. In one example, process information may be extracted from a file system directory of an application host executing a plurality of applications. Further, an expression match may be performed on the process information. Furthermore, a presence of an application running on the application host may be determined based on an outcome of the expression match.

11 Claims, 3 Drawing Sheets

APPLICATIONS DISCOVERY BASED ON FILE SYSTEM DIRECTORIES

RELATED APPLICATIONS

Benefit is claimed under 35 U.S.C. 119(a)-(d) to Foreign Application Serial No. 201841046330 filed in India entitled "APPLICATIONS DISCOVERY BASED ON FILE SYSTEM DIRECTORIES", on Dec. 7, 2018, by VMware, Inc., which is herein incorporated in its entirety by reference for all purposes.

TECHNICAL FIELD

The present disclosure relates to computing environments, and more particularly to methods, techniques, and systems for discovering applications based on file system directories in the computing environments.

BACKGROUND

In computing environments, an application host or a host device such as a physical computer, a virtual machine, a container, and the like may execute various applications. The virtual machine can be a software implementation of the physical computer that runs an operating system (OS) and virtual machine applications. The container may be an instance of a user-space running containerized applications within the OS of the virtual machine. Containers may enable OS-level virtualization in which the OS kernel allows the existence of multiple isolated containers. Further, the application host may include one or more file system directories. The file system directories may provide a structure for storing and organizing application host's files and data (e.g., code, system tools, system libraries, application ports information, and the like), which may facilitate operation of the application host.

The drawings described herein are for illustration purposes only and are not intended to limit the scope of the present subject matter in any way.

DETAILED DESCRIPTION

Examples described herein may provide an enhanced computer-based and network-based method, technique, and apparatus for discovering applications based on file system directories. Application discovery may refer to a process of identifying applications (e.g., application processes, threads, and the like) running in an application host (e.g., a physical computer, a virtual machine, a container, and the like) of a computing environment. The computing environment may be a networked computing environment such as an enterprise computing environment, a cloud computing environment, a virtualized environment, or the like. With evolving network growth and matured computation virtualization techniques, discovering the applications (e.g., applications running on the physical computer, applications running on the virtual machine, and containerized applications) may be challenging. For example, since the containerized applications may run on isolated containers (e.g., isolated environment), it may be challenging for the application host to detect running containerized applications in the containers.

Some methods for application discovery may include installing an agent on an application to discover the application and monitor events (e.g., time series data known as metrics) reported by the application. However, the agent deployed on the application may consume additional computing resources, generate overhead, include complex life cycle management, and the like. Some other methods to discover the application may include agent less approach. However, the agent less approach may be less scalable, may include complex life cycle management, may not capture applications protected by rootkit, may be less capable (e.g., limited to what can be achieved by running system scripts or application programming interface (API)), and the like.

Examples described herein may discover applications running on an application host by installing an application discovery unit/agent on the application host, without causing any additional load on the running applications. Further, the applications may be discovered based on file system directories associated with an operating system of the application host. Examples described herein may extract process information from a file system directory of the application host executing the applications, perform an expression match on the process information, and determine a presence of the application running on the application host based on an outcome of the expression match.

System Overview and Examples of Operation

Figure 1A:
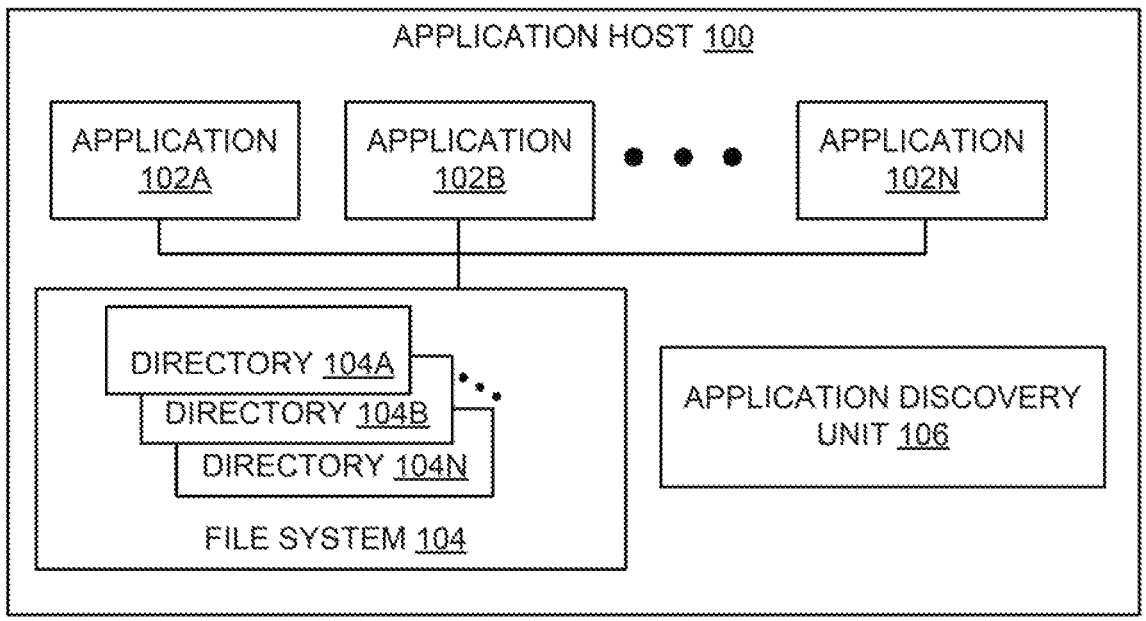
FIG. 1A is a block diagram of an example application host, including an application discovery unit to determine a presence of an application running on the application host based on a file system directory.

FIG. 1A is a block diagram of an example application host 100, including an application discovery unit 106 to determine a presence of an application (e.g., 102A-102N) running on application host 100 based on a file system directory (e.g., 104A-104N). Example application host 100 may be a physical computer, a virtual machine, a container, or the like. The physical computer may be a hardware-based device (e.g., a personal computer, a laptop, or the like) including an operating system (OS) and executing applications. The virtual machine may operate with its own guest OS on the physical computer using resources of the physical computer virtualized by virtualization software (e.g., a hypervisor, a virtual machine monitor, and the like). The container may be a data computer node that runs on top of a host OS without the need for a hypervisor or separate OS. Further, the container may enable OS-level virtualization in which the OS kernel may allow existence of multiple isolated containers. For example, a docker engine may be one of the existing platforms for creating, migrating, managing, and deploying the containers.

As shown in FIG. 1A, application host 100 may support a plurality of applications 102A-102N. An application, also referred to as an application program or application software, may be a computer software package that performs a specific function directly for an end user or, in some cases, for another application. Examples of applications 102A-102N may include word processors, database programs, web browsers, development tools, image editors, communication platforms, and the like. In one example, applications 102A-102N may use application host's OS and other supporting programs, such as system software, to function. The system software may manage operation of application host 100 and may include the OS, a hypervisor, and drivers, and/or the like.

Further, the OS of application host 100 may include a storage platform to store file system directories 104A-104N associated with the applications 102A-102N. In a file system 104, directories 104A-104N may provide a structure for storing and organizing data such as process information, network information, and the like such that the process and network information can be identified without running an extra command, for instance, ps-ef command in Linux® file system. In one example, file system directories 104A-104N may organize objects as files in a hierarchy of directories, and an identifier may be assigned to each of the files and to each of the directories. In one example, applications 102A-102N may access files using qualified paths between the applications 102A-102N and file system directories 104A-104N using the identifiers.

Furthermore, application host 100 may include application discovery unit 106 to determine the presence of applications 102A-102N running on application host 100 using file system directories 104A-104N associated with applications 102A-102N. During operation, application discovery unit 106 may extract process information from a file system directory (e.g., 104A) associated with an application (e.g., 102A). In one example, when application host 100 is a physical server or a virtual machine, application discovery unit 106 may extract the process information by determining a process identifier associated with a process running on application host 100, determining file system directory 104A corresponding to the process identifier, and extracting the process information associated with the process from file system directory 104A. In another example, when application host 100 is a container, the process of extracting the process information is described in FIG. 2.

Further, application discovery unit 106 may perform an expression match on the process information. In one example, performing the expression match may include performing a regular expression match. In the example of the physical server or the virtual machine, performing the expression match on the process information may include determining command line parameters used to initiate the process using the process information and performing the expression match on the command line parameters to determine the presence of the application. For the container example, the process of performing the expression match on the process information is described in FIG. 2.

Furthermore, application discovery unit 106 may determine the presence of application 102A based on an outcome of the expression match, i.e., in response to a determination that the regular expression matches at least a portion of the process information. In one example, determining the presence of the application may include determining characteristics/configuration details of the application such as communication port, resource identifiers, resource location, application name, application identifiers, resource name, custom properties, and/or the like.

Figure 1B:
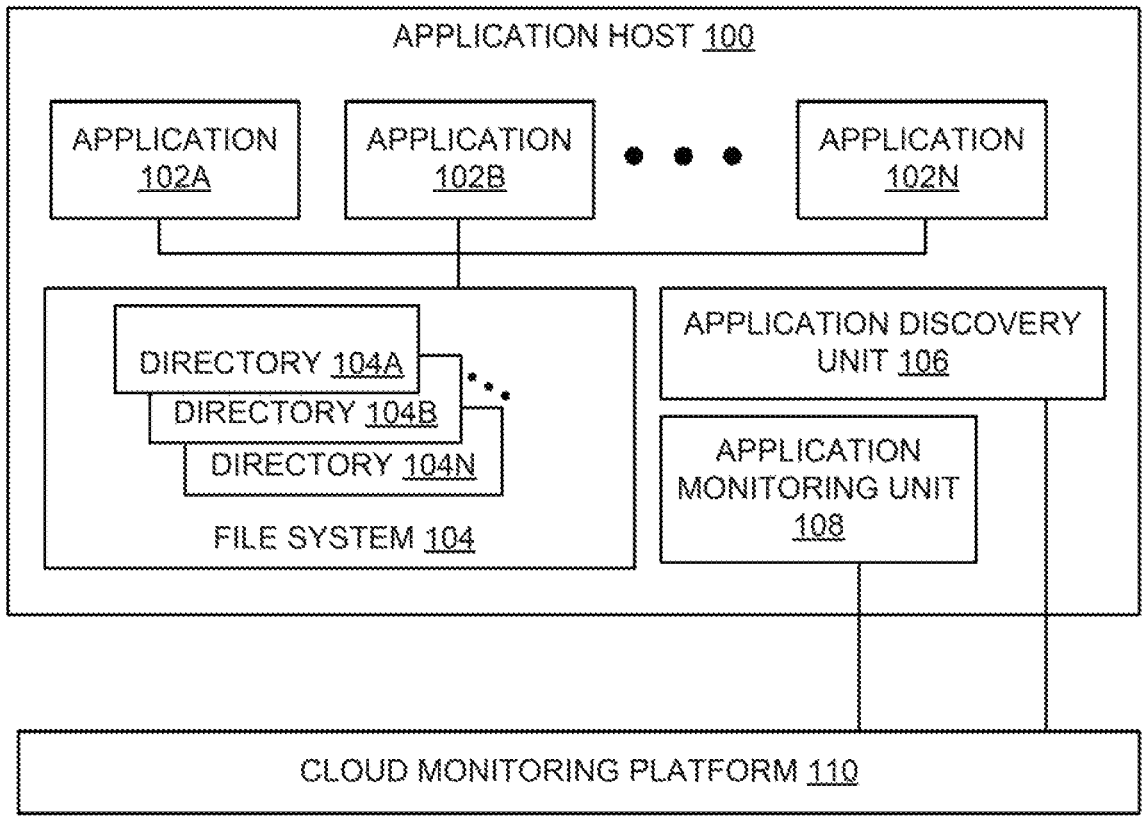
FIG. 1B is a block diagram of the example application host of FIG. 1A, depicting additional features.

FIG. 1B is a block diagram of example application host 100 of FIG. 1A, depicting additional features. For example, similarly named elements of FIG. 1B may be similar in structure and/or function to elements described with respect to FIG. 1A. As shown in FIG. 1B, application discovery unit 106 may be communicatively connected to a cloud monitoring platform 110 over a network. In one example, application discovery unit 106 may transmit information corresponding to the discovered applications (e.g., discovered application 102A) to cloud monitoring platform 110 via the network.

Example network can be a managed Internet protocol (IP) network administered by a service provider. For example, the network may be implemented using wireless protocols and technologies, such as WiFi, WiMax, and the like. In other examples, the network can also be a packet-switched network such as a local area network, wide area network, metropolitan area network, Internet network, or other similar type of network environment. In yet other examples, the network may be a fixed wireless network, a wireless local area network (LAN), a wireless wide area network (WAN), a personal area network (PAN), a virtual private network (VPN), intranet or other suitable network system and includes equipment for receiving and transmitting signals.

Further, application host 100 may include an application monitoring unit 108 to monitor discovered application 102A in real time by collecting metrics corresponding to application 102A. Furthermore, application monitoring unit 108 may be communicatively connected to cloud monitoring platform 110 over the network to transmit the collected metrics. For example, upon determining the presence of application 102A, a request may be generated to monitor and/or manage application 102A. Accordingly, cloud monitoring platform 110 including a controller unit may install application monitoring unit 108 on application host 100 and may activate respective application plugin. Further, the application plugin may then connect to application 102A, remotely collect the metrics, and transmit the collected metrics to cloud monitoring platform 110. In some examples, application 102A may be monitored for health, connections, resource usage, and/or the like using the collected metrics. Example resource usage may be associated with at least one resource such as a processor, a memory, a network hardware, a bandwidth, or the like. Further, managing application 102A may include performing management functions on application 102A based on monitoring. Example management functions may include alert generation, restarting, and/or troubleshooting application 102A based on the monitoring. Furthermore, the controller unit may install/uninstall and enable/disable the application plugin on demand.

In some examples, the functionalities described herein, in relation to instructions to implement functions of application discovery unit 106, application monitoring unit 108, and any additional instructions described herein in relation to the storage medium, may be implemented as engines or modules comprising any combination of hardware and programming to implement the functionalities of the modules or engines described herein. The functions of application discovery unit 106 and application monitoring unit 108 may also be implemented by a respective processor. In examples described herein, the processor may include, for example, one processor or multiple processors included in a single device or distributed across multiple devices.

Figure 2:
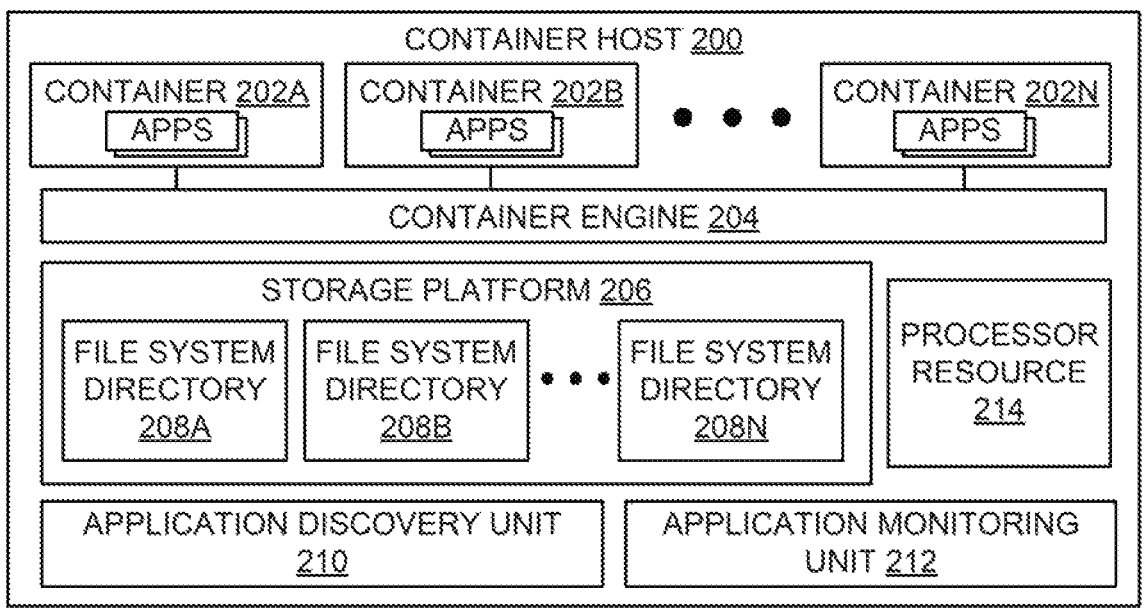
FIG. 2 is a block diagram of an example container host, including an application discovery unit to determine a presence of one or more applications running on containers based on file system directories.

FIG. 2 is a block diagram of an example container host 200, including an application discovery unit 210 to determine a presence of one or more applications running on containers 202A-202N based on file system directories 208A-208N. As shown in FIG. 2, container host 200 may include a container engine 204 executing containers 202A-

202N. For example, container engine 204 may provide the preconfigured containers 202A-202N with respective sets of containerized compute resources that utilize corresponding allocated storage resources of a storage platform 206 (e.g., a software-defined storage). The allocated storage resources of storage platform 206 may include respective pluggable storage engines allocated to respective ones of containers 202A-202N.

For example, container engine 204 can be implemented as a Docker engine, although other types of containers can be used in other embodiments. The Docker engine is preconfigured to run on CoreOS®, an open source lightweight operating system based on the Linux® kernel, and particularly configured to provide functionality for deploying applications in containers 202A-202N. Another example of a lightweight operating system suitable for use in implementing at least portions of container engine 204 in some examples is VMware® Photon OS™ and is designed to boot quickly on VMware® platforms.

In one example, container host 200 may be a virtual machine that implements or hosts containers 202A-202N. Further, container host 200 may include a processor resource 214 coupled to a memory resource (e.g., a storage platform 206). Containers 202A-202N may refer to software instances that enable virtualization at a OS level. That is, with containerization, the kernel of the OS that manages container host 200 can provide multiple isolated user space instances. Further, a container (e.g., 202A) may provide an executable environment with a complete file system directory (e.g., 208A).

Further, container host 200 may include storage platform 206 to store file system directories 208A-208N associated with the applications running on the containers 202A-202N and to implement storage resources for utilization by the containers 202A-202N. For example, file system directory (e.g., 208A) may include information characterizing one or more parameters of a container operating environment of container (e.g., 202A) including one or more of a network parameter, a port parameter, a storage parameter, and a command line parameter. Example storage platform 206 may be local or remote and may include a single data structure or multiple data structures (e.g., databases, repositories, files, and the like) residing on one or more mass storage devices, such as magnetic or optical storage based discs, solid-state-drives (SSDs), or hard drives.

Furthermore, container host 200 may include application discovery unit 210. Example application discovery unit 210 may reside in container host 200 and may be implemented by processor resource 214 executing instructions stored in the memory resource (e.g., storage platform 206) of container host 200. In one example, application discovery unit 210 may extract process information from file system directory 208A corresponding to container 202A. In one example, application discovery unit 210 may detect a container identifier of container 202A running on container host 200, determine a process identifier associated with a process running on container 202A based on the container identifier, determine file system directory 208A associated with the process identifier, and extract the process information associated with the process running on container 202A from file system directory 208A. For example, for each running process, there may be a file system directory with the name as "PID" of the process under the file system directory "/proc". Further, a container's root file system can be accessed from container host 200 using the path "/proc/${CONTAINER_PID}/root/". Thus, the process information of the container can be accessed from the file system directory "/proc/${CONTAINER_PID}/root/proc/".

Further, application discovery unit 210 may perform an expression match on the process information. In one example, application discovery unit 210 may determine command line parameters/arguments used to initiate the process using the process information and perform the expression match on the command line parameters to determine the presence of the application. For example, for discovering the process information running in container 202A, the command line parameters (e.g., which may be used to launch the process) may be used. Since the container's root file system can be accessed from "/proc/${CONTAINER_PID}/root" and the command line parameters may be stored in generic path "/proc/${PID}/cmdline", the command line parameters for the process running inside container 202A may be accessed with path "/proc/$ { CONTAINER_PID}/root/proc/${PID}/cmdline". Furthermore, application discovery unit 210 may determine the presence of the application running on container 202A based on an outcome of the expression match.

For example, for discovering the presence the applications running on different containers, application discovery unit 210 may execute an example workflow depicted in below Table 1:

TABLE 1

```
getCommandLine
    String[] commandLine = []
    Int[] containerProcessIds = getContainerToPID();
    ForEach containerProcessId in containerProcessIds
        Int[] processIds = getProcessId(containerProcessId);
        ForEach processId in processIds
            commandLine[i]=getCommandLine
            (containerProcessId, processId)
        Done
    Done
    return commands
getContainerToPID
    return docker inspect -format {{.State.Pid}}<ContainerID>
getProcessId(containerProcessId)
    return fine /proc/containerProcessId/root/proc/ -maxdepth 1 -
    maxdepth 1 -type d -iname "[0-9]*"
getCommandLine(containerProcessId, processId)
    return /proc/ containerProcessId /root/proc/processId/cmdline
```

Further, container host 200 may include an application monitoring unit 212 to monitor the discovered application running on container 202A by collecting metrics corresponding to the application. Application monitoring unit 212 may then transmit the collected metrics to a cloud monitoring platform over a network. For example, cloud monitoring platform may determine health of the application based on analyzing the collected metrics. In one example, cloud monitoring platform may include a controller unit to perform life cycle management of application discovery unit 210 and application monitoring unit 212 installed on container host 200.

Example application discovery unit 210 and application monitoring unit 212 residing in container host 200 may be implemented by the processor executing instructions stored in the memory of container host 200. Further, installing application discovery unit 210 and application monitoring unit 212 on container host 200 may facilitate in reducing memory and central processing unit (CPU) footprints of containers 202A-202N and eliminate possible security issues.

In some examples, the functionalities described herein, in relation to instructions to implement functions of application discovery unit 210, application monitoring unit 212, and any additional instructions described herein in relation to the storage medium, may be implemented as engines or modules comprising any combination of hardware and programming to implement the functionalities of the modules or engines described herein. The functions of application discovery unit 210 and application monitoring unit 212 may also be implemented by a respective processor. In examples described herein, the processor may include, for example, one processor or multiple processors included in a single device or distributed across multiple devices.

Figure 3:
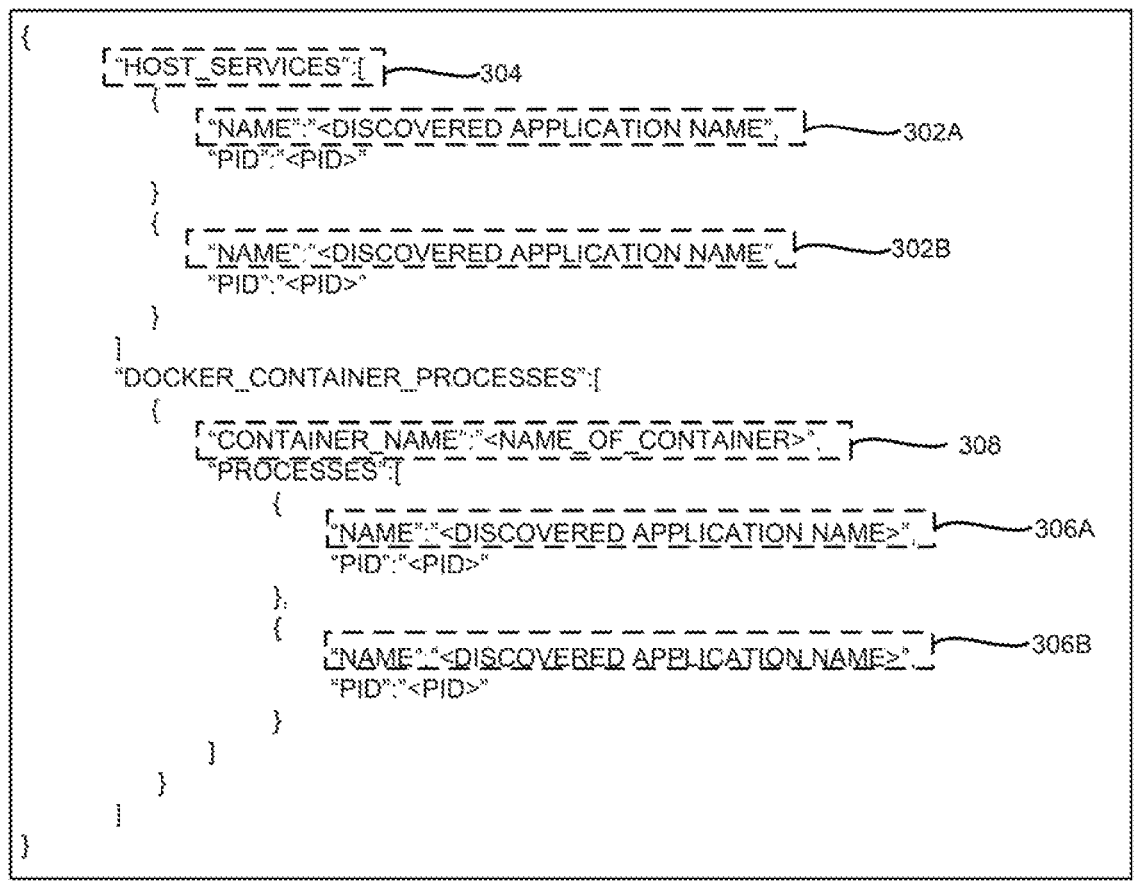
FIG. 3 is an example JavaScript Object Notation (JSON) structure to represent the discovered applications.

FIG. 3 is an example JavaScript Object Notation (JSON) structure 300 to represent discovered applications. In one example, to determine a presence of an application running on a container, a container identifier of the container running on a container host (e.g., virtual machine) may be detected. For example, below mentioned command in equation (1) may be used to detect container identifiers of containers running on a virtual machine.

root@ubuntu:~#docker ps-no-trunc-format
"table{{.ID}}\t{{.Ports}}" (1)

Upon executing the command in equation (1), the container identifiers and corresponding images and ports are determined as shown in Table 2.

TABLE 2

| CONTAINER IDs | IMAGE | PORTS |
|---|---|---|
| c0d38b7432d0 | influxdb | 0.0.0.0:8086->8086/tcp |
| 00eb61870af7 | mysql | 3306/tcp |
| bd3e4add1797 | vmware/vrops-vcd-tenant-app-admin | 8080/tcp, 0.0.0.0:8443->8443/tcp |
| 114951c33d44 | vmware/vrops-vcd-tenant-app-admin | 0.0.0.0:80->80/tcp |

Further, a process identifier associated with a process running on the container may be determined based on the container identifier. For example, when a command in equation (2) is executed to determine process identifiers associated with the container identifiers "00eb61870af7" and "bd3e4add1797", the process identifiers "25657" and "19774" may be obtained.

root@ubuntu:~#docker inspect-
format{{.State.Pid}}00eb61870af7
bd3e4add1797 (2)

In the example, a file system directory associated with the process identifier "25657" may be determined using a command in equation (3a). Further, output of executed command (3a) is depicted as (3b) as shown below.

root@ubuntu:~#find/proc/25657/root/proc/-maxdepth
1-mindepth 1-type d-iname "[0-9]*" (3 a)

/proc/25657/root/proc/1 (3b)

Further, process information associated with the process running on the container may be determined based on the file system directory using command in equation (4a). For example, "cmdline" file may be looked in a specific file system directory derived from equation (3a). Further, output of executed command (4a) is depicted as (4b) as shown below. Thus, the presence of an application "mysql" is determined.

root@ubuntu:~#cat/proc/25657/root/proc/1/
cmdline&&echo"" (4a)

mysqld (4b)

In one example, processes may be grouped with respect to containers based on the process information and the corresponding JSON structure may be constructed as shown in FIG. 3. As shown in JSON structure 300, discovered application names 302A and 302B may represent applications running on an application host 304 (e.g., a physical server and a virtual machine). Further, discovered applications names 306A and 306B may represent applications running on a container with container name 308. Further, JSON structure 300 may be transmitted to a cloud monitoring platform for further processing and actions.

In one example, upon discovering the application, an application monitoring unit may be deployed on the container host to monitor the discovered application. For example, based on the discovered application, respective plugins may be activated and data monitoring for the application may commence in the container host. Further, the application monitoring unit may connect to the application running inside the container using container internet protocol (IP) address. Further, the collected metric data may be sent to the cloud monitoring platform for analysing health of the application, for instance. A sample of "MySQL" application metric data collected by the application monitoring unit using container IP is shown below:

Mysql,server=172.17.0.4:3306,host=ubuntuperformance_
schema_thread_instances_lost=0i,qcache_hits=0i,qcache_
lowmen_prunes=0i,qcache_not cached=81i,qcache_
queries_in_cache=0i,select_full_join=0i,select_full_ range_
join=0i,performance_schema_table_lock_start_lost=0i,performance_
schema_users_lost=0i,prepared_Stmt_count=0i,cache_free_
memory=1031832i,performance_schema_thread_classes_lost=
0i,qcache free blocks=1i,qcache_total_blocks=1i,queries=
193i,select_range_check=0i,performance_schema_
table_instances_lost=0i,qcache_inserts=0i,questions=
192i,select_range=0i15172216400000000000

Example Processes

Figure 4:
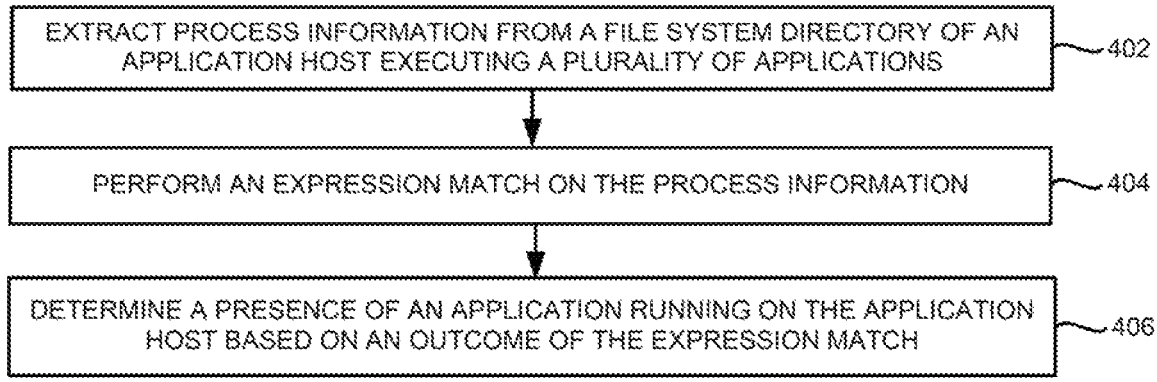
FIG. 4 is an example flow diagram illustrating determining a presence of an application running on an application host based on file system directories.

FIG. 4 is an example flow diagram 400 illustrating determining a presence of an application running on an application host based on file system directories. It should be understood that the process depicted in FIG. 4 represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 402, process information may be extracted from a file system directory of an application host executing a plurality of applications. At 404, an expression match may be performed on the process information. In one example, performing the expression match comprises performing a regular expression match. At 406, a presence of an application running on the application host may be determined based on an outcome of the expression match. Further, example flow diagram 400 may include real-time monitoring the application and determining health of the application based on the real-time monitoring. An example discovery and monitoring of the application is explained with respect to FIGS. 1-3.

Figure 5:
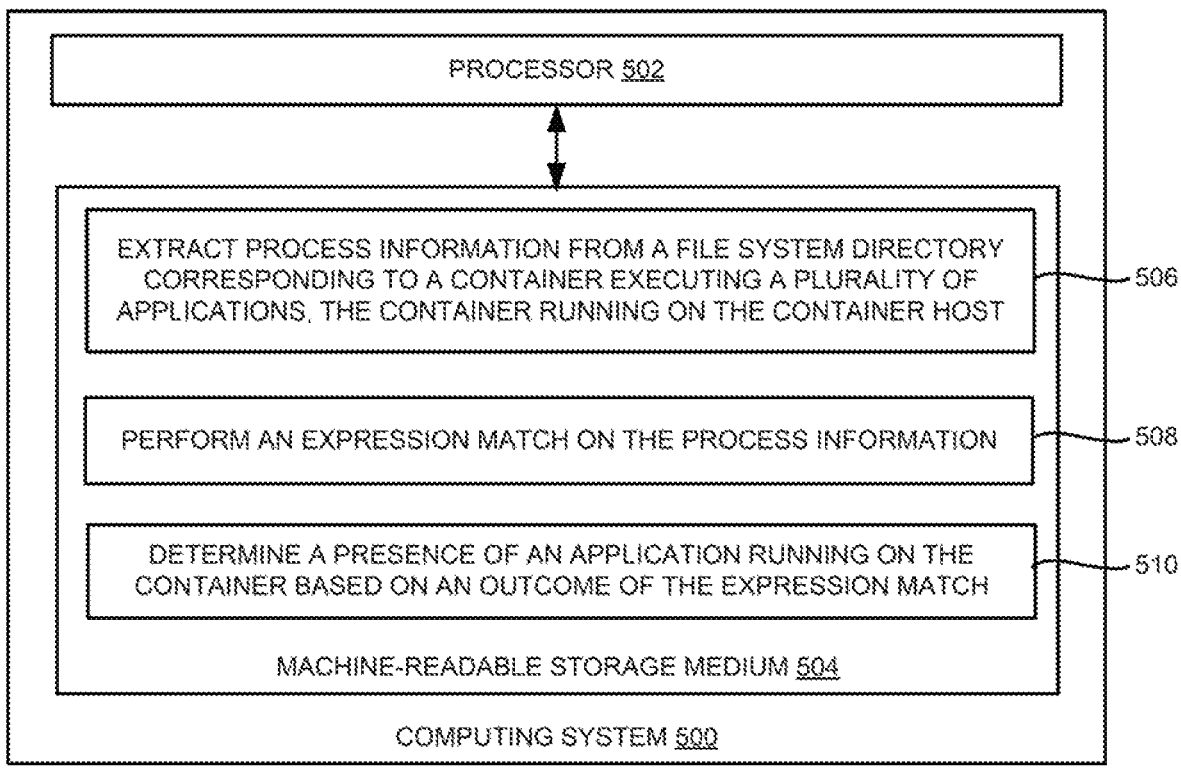
FIG. 5 is a block diagram of an example computing device including non-transitory computer-readable storage medium storing instructions to determine a presence of an application running on a container based on file system directories.

FIG. 5 is a block diagram of an example computing system 500 including non-transitory computer-readable storage medium, storing instructions to discovery an application running on a container based on file system directories. Computing system 500 may include a processor 502 and a machine-readable storage medium 504 communicatively coupled through a system bus. Processor 502 may be any type of central processing unit (CPU), microprocessor, or processing logic that interprets and executes machine-readable instructions stored in machine-readable storage medium 504. Machine-readable storage medium 504 may be a random-access memory (RAM) or another type of dynamic storage device that may store information and machine-readable instructions that may be executed by processor 502. For example, machine-readable storage medium 504 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, machine-readable storage medium 504 may be a non-transitory machine-readable medium. In an example, machine-readable storage medium 504 may be remote but accessible to computing system 500.

Machine-readable storage medium 504 may store instructions 506-510. In an example, instructions 506-510 may be executed by processor 502 for discovering the application running on the container based on file system directories. Instructions 506 may be executed by processor 502 to extract process information from a file system directory corresponding to the container executing a plurality of applications. The container may be running on the container host. In one example, instructions to extract the process information from the file system directory may include instructions to detect a container identifier of the container running on the container host, determine a process identifier associated with a process running on the container based on the container identifier, determine the file system directory associated with the process identifier, and extract the process information associated with the process running on the container from the file system directory.

Instructions 508 may be executed by processor 502 to perform an expression match on the process information. In one example, instructions to perform the expression match on the process information may include instructions to determine command line parameters used to initiate the process using the process information and perform the expression match on the command line parameters to determine the presence of the application. Instructions to perform the expression match may include instructions to perform a regular expression match.

Further, instructions 510 may be executed by processor 502 to determine the presence of the application running on the container based on an outcome of the expression match. Furthermore, machine-readable storage medium may include instructions to monitor the application running on the container to collect metrics corresponding to the application in real time and transmit the collected metrics to a cloud monitoring platform over a network. Further, the cloud monitoring platform may determine health of the application based on analyzing the collected metrics.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A method comprising:
   extracting, by a processor of an application host, process information from a file system directory of the application host executing a plurality of applications, wherein the application host comprises a container running on a container host, and wherein extracting the process information from the file system directory comprises:
   detecting a container identifier of the container running on the container host;
   determining a process identifier associated with a process running on the container based on the container identifier;
   determining the file system directory associated with the process identifier; and extracting the process information associated with the process running on the container from the file system directory;

performing, by the processor, an expression match on the process information, wherein performing the expression match on the process information comprises:

determining command line parameters used to initiate the process using the process information; and performing the expression match on the command line parameters; and determining, by the processor, a presence of an application running on the application host based on an outcome of the expression match.

2. The method of claim 1, further comprising:
real-time monitoring the application; and
determining health of the application based on the real-time monitoring.

3. The method of claim 1, wherein performing the expression match comprises performing a regular expression match.

4. A method comprising:
extracting, by a processor of an application host, process information from a file system directory of the application host executing a plurality of applications, wherein the application host is one of a physical server and a virtual machine, and wherein extracting the process information from the file system directory comprises:

determining a process identifier associated with a process running on the application host;

determining the file system directory corresponding to the process identifier; and extracting the process information associated with the process running on the application host from the file system directory;

performing, by the processor, an expression match on the process information, wherein performing the expression match on the process information comprises:

determining command line parameters used to initiate the process using the process information; and performing the expression match on the command line parameters; and determining, by the processor, a presence of an application running on the application host based on an outcome of the expression match.

5. An apparatus comprising:
a container host implementing a container, the container executing a plurality of applications;

a storage platform associated with the container host to store a plurality of file system directories associated with the plurality of applications and implementing storage resources for utilization by the container; and an application discovery unit residing in the container host to:

extract process information from a file system directory of the plurality of file system directories corresponding to the container, wherein the application discovery unit is to:

detect a container identifier of the container running on the container host;

determine a process identifier associated with a process running on the container based on the container identifier;

determine the file system directory associated with the process identifier; and extract the process information associated with the process running on the container from the file system directory;

perform an expression match on the process information, wherein the application discovery unit is to:

determine command line parameters used to initiate the process using the process information; and perform the expression match on the command line parameters; and determine a presence of an application running on the container based on an outcome of the expression match.

6. The apparatus of claim 5, wherein the container host comprises an application monitoring unit to:

real-time monitor the application running on the container to collect metrics corresponding to the application; and transmit the collected metrics to a cloud monitoring platform over a network, wherein cloud monitoring platform is to determine health of the application based on analyzing the collected metrics.

7. The apparatus of claim 6, wherein the container host comprises a processor resource coupled to a memory resource, and wherein the application discovery unit and the application monitoring unit are implemented by the processor executing instructions stored in the memory.

8. The apparatus of claim 5, wherein the file system directory comprises information characterizing one or more parameters of a container operating environment of the container including one or more of a network parameter, a port parameter, a storage parameter, and a command line parameter.

9. A non-transitory machine-readable storage medium encoded with instructions that, when executed by a processor of a container host, cause the processor to:

extract process information from a file system directory corresponding to a container executing a plurality of applications, the container running on the container host, wherein instructions to extract the process information from the file system directory comprises instructions to:

detect a container identifier of the container running on the container host;

determine a process identifier associated with a process running on the container based on the container identifier;

determine the tile system directory associated with the process identifier; and extract the process information associated with the process running on the container from the file system directory;

perform an expression match on the process information, wherein instructions to perform the expression match on the process information comprises instructions to:

determine command line parameters used to initiate the process using the process information; and perform the expression match on the command line parameters; and determine a presence of an application running on the container based on an outcome of the expression match.

10. The non-transitory machine-readable storage medium of claim 9, further comprising instructions that, when executed by the processor, cause the processor to:

real-time monitor the application running on the container to collect metrics corresponding to the application; and transmit the collected metrics to a cloud monitoring platform over a network, wherein cloud monitoring platform is to determine health of the application based on analyzing the collected metrics.

11. The non-transitory machine-readable storage medium of claim 9, wherein instructions to perform the expression match comprises instructions to perform a regular expression match.

* * * * *